Sept. 28, 1965 D. B. PRICE 3,209,105
DETACHABLE THERMORESPONSIVE SWITCH CONTROL MEANS
Filed April 26, 1963
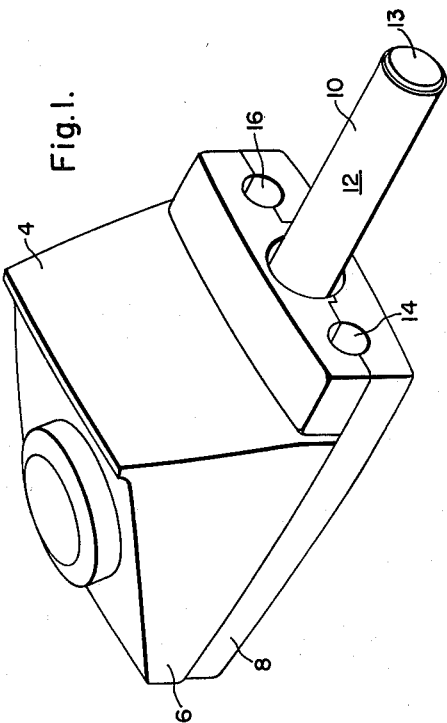
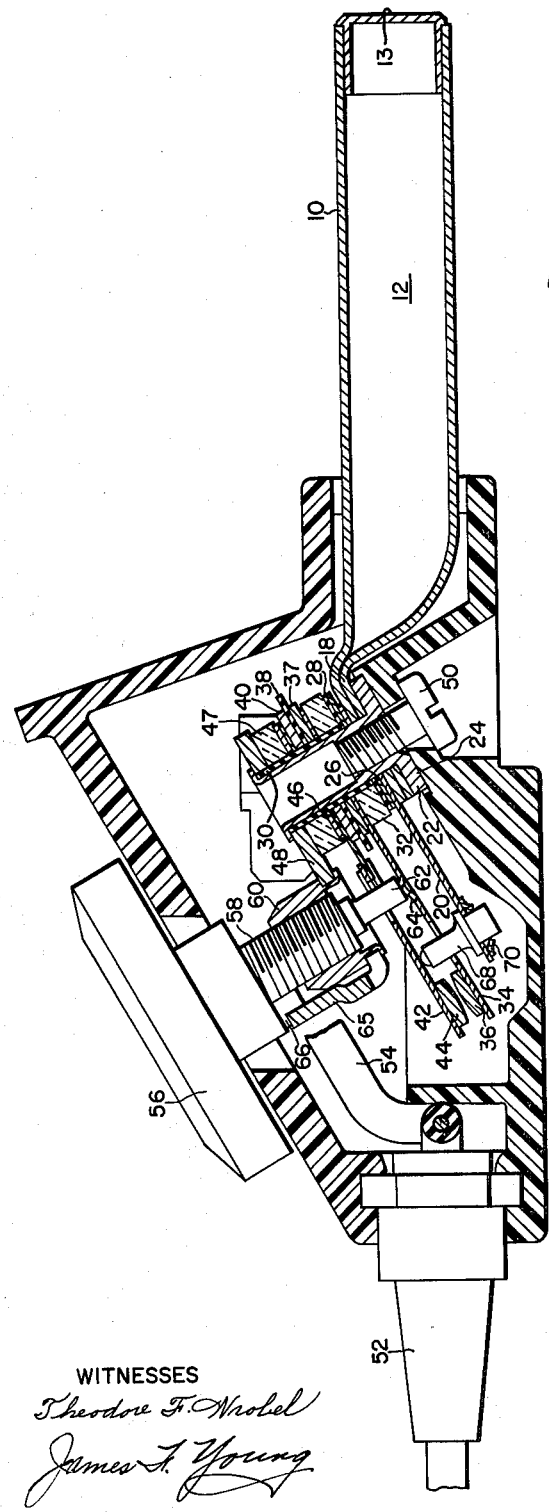
WITNESSES
Theodore F. Nrobel
James F. Young
INVENTOR
David B. Price
BY
Ralph T. French
ATTORNEY United States Patent Office 3,209,105
Patented Sept. 28, 1965

3,209,105
DETACHABLE THERMORESPONSIVE SWITCH
CONTROL MEANS
David B. Price, Washington Township, Richland County,
Ohio, assignor to Westinghouse Electric Corporation,
Pittsburgh, Pa., a corporation of Pennsylvania
Filed Apr. 26, 1963, Ser. No. 275,883
2 Claims. (Cl. 200—136.5)

The present invention relates to electrical plugs for detachable connection to cooking utsensils, and more particularly to temperature control plugs having temperature sensing devices incorporated therein.

Plug-in controls for cooking utensils of the immersible type must be so designed to provide electrical connection from the household outlet to the heating element of the utensil. If various temperature ranges are to be provided a temperature sensing or temperature conducting probe must be provided in the control to give an indication of the temperature of the utensil. Among the presently known plug-in controls are those which may be categorized in a group including those plug-in controls which incorporate the heat sensing actuating member within the probe itself. This group includes the differential expansion type, which consists of a closed end sleeve with an expansion rod extending longitudinally through the center of the sleeve. The differential expansion type may also include a warming heater disposed around the actuating expansion member. Another type of probe which is of the bimetallic type consists of a seeve with an end cap supporting a cantilever bimetal which extends longitudinally through the center of the sleeve. Again, in this type of probe, the actuating member is within the probe. Other types of bimetal probes do not have the bimetal element in the probe itself, but require a warming heating element within the probe. Another probe presently used is of the hydraulic type which contains a heat expandible liquid which operates a plunger or bellows. In this type of probe the actuating liquid is contained within the probe itself. All of the above-mentioned probes contain the actuating member within the probe itself which results in the evident disadvantages of difficulty in fabrication and moreover, susceptibility to damage.

Another category of probes are those of the solid variety. That is, the probe itself has a solid cross-section of a heat conducting metal. There is, of course, no activating member included within the probe and the probe serves only to conduct heat. However, the disadvantage of utilizing a solid probe is that it has a high mass thus resulting in an undesirable thermal time lag for the heat to be conducted through the solid probe back to a temperature sensing element in the control portion of the plug-in. Due to the high heat capacity of the solid probe time lag may be considerable especially at warming heat temperature differentials.

It is therefore an object of the present invention to provide a new and improved temperature control plug not requiring the actuating element or heating element to be in the temperature transmitting probe thereof.

It is a further object of the present invention to provide a new and improved temperature control plug which has a large temperature pick up area and has a low time lag between the temperature of the utensil and the actuating member of the control.

Generally, the above cited objects are accomplished by providing a temperature control plug in which the probe thereof comprises a tubular member having no actuating or heating elements therein and with the tubular probe being in intimate thermal contact with a temperature responsive element which is mounted within the control plug itself.

These and other objects and advantages will become more apparent when considered in view of the following specification and drawings in which:

FIG. 1 is an isometric drawing of the control plug of the present invention; and FIG. 2 is a sectional view of the control plug of the present invention.

Referring to FIGS. 1 and 2, a temperature control plug is shown having a hollow casing 4, which has a top section 6 and a bottom section 8. Extending from within the hollow casing is the probe 10, which comprises a cylindrical tube of a good heat conducting material such as, for example, aluminum or copper. The probe 10 is hollow having the aperture 12 therethrough. An end cap 13 may optionally be fitted into the open end of the probe 10. In the casing 4 are apertures 14 and 16 wherein female electrical connectors, not shown, are disposed. Male electrical connectors of a cooking utensil may be engaged therein in order to provide electrical current to the heating element of the utensil.

The probe 10 extends into the hollow casing 4 with the back portion of the probe within the casing being flattened so that the side walls come together as shown at 18 of FIG. 2. Disposed over the portion 18 of the probe 10 in intimate thermal contact therewith is a temperature sensitive member 20, which, for example, may comprise a bimetal strip which is very well-known in the art. To mount the bimetal strip 20 within the casing a metal bushing 22 is disposed on the surface 22 of the bottom portion 8 of the casing 4. The portion 18 of the probe 10 rests on the head portion of the bushing 22. The bimetal strip 20 is placed over the portion 18 of the probe 10. Next, a metal washer 26 is placed over the bimetal strip 20. A heat insulating washer 28 is placed over the metal washer 26. A ceramic washer 32 is disposed over the washer 28. The cantilever switch member 34 is disposed over the upper portion of the ceramic washer 32. At the other end of the switch member 34 is disposed contact 36. The switch member 34 is of an electrically conductive material. Over the switch member 34 and the upper portion of the ceramic washer 32 is disposed a terminal flange 37 from which an electrical connection runs to where electrical contact can be made through one of the apertures 14 or 16. Over the terminal flange 37 is disposed an insulating electrical washer 38. The insulating washer 38 serves to insulate the switch member 34 and its terminal flange 37 from overlying terminal flange 40, which has an electrical connection running to the other of the apertures 14 or 16. A contact lever switch member 42 of electrically conducting material is disposed in electrical contact with the terminal flange 40 and has a contact 44 which, when engaged with its mating contact 36, establishes an electrical circuit to the heater of the utensil being controlled. A metal washer 46 is placed over the switch member 42 about the insulating sleeve 30. A ceramic washer 47 is disposed over the washer 46. The bottom portion of the ceramic washer 47 extends downwardly to insulate the washer 46, the switch member 42 and the terminal flange 40 from the bushing member 22. A metal flange member 48 is disposed over the ceramic washer 46 and the bushing member 22 is crimped over the flange member 48 to hold the structure rigidly together. The bottom inside surface of the flange 22 is threaded to receive the bolt 50, which is passed through from the outside of the bottom portion 8 of the casing 4 and holds the above-described assembly rigidly within the casing.

An electrical circuit is provided with one conductor from the input cord 52 being connected directly through the conductor 54 to a female contact, not shown, within the aperture 16. The other electrical conductor from the cord 52 is connected through the terminal flange 36, the switch member 34, the contact 36, the contact 44, the switch member 42, the terminal flange 40 to the female contact, not shown, disposed within the aperture 14 and then through the heating element in the utensil back to the female contact, not shown, disposed within the aperture 16, thus completing the circuit.

The temperature control is adjusted by turning the control knob 56 and the latter, together with the screw mechanism 58, is supported by the flange 48 through the bushing 60, which has its bottom edge crimped to the bottom surface of the flange 48. The screw mechanism 58 has a bottom stud 62 which extends through a hole in the switch member 42 and makes physical contact with the switch member 34 at the raised portion 64. Thus, by rotating the control knob 56, which is placed over the screw mechanism 58, the stud 62 may be caused to engage the switch member 34 to move the contact 36 away from the contact 44 of the switch member 42. By turning the knob 56 the relative positions of the contacts 36 and 44 may be varied to change the temperature of the utensil at which the heating circuit is interrupted. A stop extension 65 is included on the flange 48 to engage the stop stud 66 of the screw mechanism 58. The control plug is shown in its off condition in FIG. 2.

To effect uniform temperature control of the cooking utensil a feedback path is required between the temperature transmitting probe 10 and the temperature responsive bimetal element 20. These two elements are intimately connected in thermal contact. In the bimetal element 20 is mounted the stud member 68, which is made of non-electrically conductive material. The stud 68 is held in place in the bimetal element 20 through the lock washer 70. The stud 68 extends through the switch member 34 and makes contact with the switch member 42. The temperature sensing element 20 is so disposed that as the temperature of the cooking utensil is raised the heat is transmitted quickly through the tubular temperature transmitting member 10 back through the portion 18 thereof to the bimetal element 20. The bimetal element 20 under the effect of the increased temperature will then be deformed in a direction toward the top of the casing 4. This will cause the stud 68 to raise the switch member 42. The switch member 34, due to its inherent resiliency, follows the switch member 42 until stopped by the stud 62 of the control knob 56. Thereafter, further upward movement of the member 42 separates the contacts 36 and 44. The feedback loop is then completed through the temperature transmitting or conducting member 10 back through the bimetal element 20 which in turn controls the electrical circuit to switch and control the proper amount of heating current to be applied to the heating element of the utensil. If a higher temperature is desired, the setting on the control knob 56 will be adjusted to the higher temperature. This will cause the contacts 44 and 36 to be closer due to the action of the screw mechanism 58 on the switch member 34. As continued heating current is applied to the heating element the temperature conducting probe 10 will conduit the increased heat of the vessel back to the temperature responsive element 20 which will deform a greater extent to disconnect the electrical connection between the contacts 36 and 44 when the desired temperature is reached. On the other hand, if a lower temperature is desired the screw mechanism operated through the control knob 56 will force the contacts 34 and 44 further apart making it more difficult to form an electrical circuit thereto. The utensil then will have heating current applied for a shorter period and will cool down. The lower temperature will be conducted by the probe 10 which will quicky cool in response to the cooling of the utensil and will transmit this information to the temperature responsive bimetal element 20 which will deform in response to the lower temperature and control the opening and closing of the contacts 36 and 44 in response to the new desired temperature.

It should be noted that the response time of the probe member is very low in that there is a very little mass of material in the tubular member and there is a relativealy large area from which the probe can gather heat from the cooking utensil. The heat gathered is quickly transferred back through the probe 10 to the portion 18 where the bimetal temperature responsive element 20 can respond in accordance with the temperature transmitted by the tubular probe 10.

Although the present invention has been described with a certain degree of particularity, it should be understood that the present disclosure has been made only by way of example and numerous changes in the details of construction and the combination and arrangement of parts may be resorted to without departing from the scope and spirit of the present invention.

I claim as my invention:

1. A temperature control plug for use with a cooking utensil comprising, a casing, a tubular probe projecting from said casing and adapted to be received in a recess in the utensil for receiving and transmitting the temperature of the utensil, said tubular probe being closed at both ends and the hollow interior thereof being filled with a gas exclusively, whereby it is of low mass and low heat capacity, and temperature sensitive switch means mounted within said casing in a heat conducting relationship with said tubular probe, said switch means being actuated in response to the temperature sensed by said tubular member.

2. A temperature control plug for use with a cooking utensil comprising; switch means for controlling a supply of electrical energy for said utensil, a thermostat for controlling said switch means, a casing housing said switch means and said thermostat, and means for transmitting heat from the utensil to said thermostat, the last-mentioned means comprising a tubular probe projecting from the casing with one terminal portion within said casing and in heat transfer relation to said thermostat, and the other terminal portion spaced from the casing for reception in a recess in the utensil, said tubular probe having good thermal conductivity, and the hollow interior of said probe being completely free of internal structure, whereby said probe is of low mass and low heat capacity with consequent low thermal lag, both in heating and cooling.

References Cited by the Examiner

UNITED STATES PATENTS

| | | | |
|---|---|---|---|
| 1,881,610 | 10/32 | Hyde | 165—179 |
| 2,141,775 | 12/38 | Varley. | |
| 2,936,359 | 5/60 | Sheahan | 200—136.5 |

OTHER REFERENCES

Marks: Mechanical Engineers' Handbook, sixth edition, by Theodore Baumeister, published by McGraw-Hill Book Co. in 1958, pp. 4–92 through 4–96 relied upon.

BERNARD A. GILHEANY, *Primary Examiner.*

ROBERT K. SCHAEFER, *Examiner.*